United States Patent Office 3,048,787
Patented Aug. 7, 1962

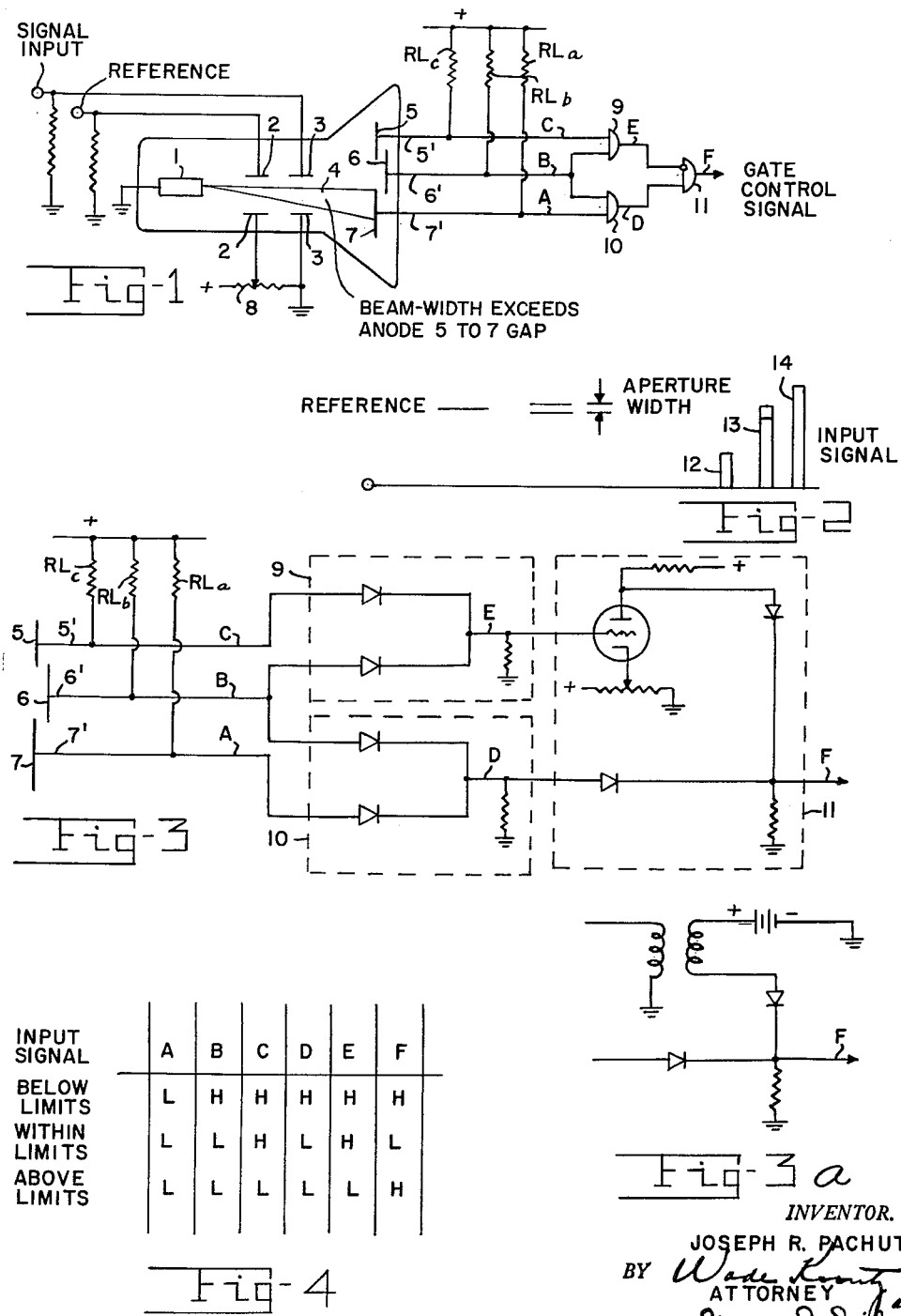

3,048,787
AMPLITUDE DISCRIMINATOR DEVICE
Joseph R. Pachuta, Endicott, N.Y., assignor to the United States of America as represented by the Secretary of the Air Force
Filed Feb. 12, 1960, Ser. No. 8,472
6 Claims. (Cl. 328—150)

The invention relates to an amplitude discriminator device that includes a cathode-ray tube and associated circuits which will allow the selection of pulses whose amplitudes fall within certain limits of an external reference signal.

It is the principal object of this invention to provide a device which will select pulses whose amplitudes fall within certain limits of an external reference potential. Briefly, this is accomplished by provision of a cathode-ray tube in combination with specific associated circuits. The cathode-ray tube consists essentially of an electron gun for producing a fan shaped beam of electrons, a pair of deflecting plates to control the reference level of the fan shaped beam, a pair of deflecting plates for signal input, and several overlapping target electrodes upon which the fan shaped beam will strike. When one or more of the target electrodes is illuminated by action of the beam, a signal will appear on the electrode or electrodes' output lead or leads. The target electrodes' output leads are connected, for example, where three target electrodes are used, to an external pair of circuits. The central target electrode lead is a common input to both circuits, while each outer electrode lead is connected as an input to one or the other circuit. Signals at both inputs of either or both of the circuits will give an output signal for that or those circuits. The output leads of the pair of circuits are the input leads to a third circuit. The third circuit functions to produce an output signal only when there is an input signal from one, but not both, of the said pair of circuits. A signal on one of the two input leads, which may be termed an inhibiting input lead, prevents an output under any condition.

A more detailed description of the invention will be given in connection with the specific embodiment thereof shown in the accompanying drawings in which:

FIG. 1 is a schematic diagram of the novel amplitude discriminator device, and

FIG. 2 illustrates the discrimination effect of the device upon pulses of amplitude of various levels, and FIG. 3 is a schematic diagram of a possible external circuit to accomplish the novel result, and FIG. 3a is a schematic diagram of a possible modification of the circuit of FIG. 3, and FIG. 4 is a tabulation of relative potential values at critical points under certain signal input conditions of the schematic diagrams of FIGS. 1 and 3.

FIG. 1 illustrates the components of cathode-ray vacuum tube including electron gun 1 which serves as a source of electrons for the tube and forms the electrons into a fan shaped beam 4, a first pair of deflection plates 2, a second pair of deflection plates 3, and target electrodes 5, 6, 7. The electron gun 1 consists of conventional components (not shown) that will produce the desired fan shaped beam 4.

The target electrode 7 is preferably larger than the target electrodes 5, 6 so that a larger range of reference voltages may be applied to the deflection plates 2 by a rheostat 8.

The target electrodes are aligned across the target end of the tube in overlapping relationship to provide an uninterrupted signal when the electron beam is deflected across the tube. Leads 5', 6', 7' are output leads respectively for target electrodes 5, 6, 7 and are connected to the external circuitry.

The external circuitry, as indicated by FIGS. 1 and 3, comprises three gating circuits 9, 10 and 11. The gating circuits 9, 10 are designated in the art as "and" gates and the gating circuit 11 is designated as an "inhibited and" gate. The construction and operation of such gates are well understood and are described in the literature such, for example, as the Proceedings of the Institute of Radio Engineers, vol. 41, No. 10, Oct. 1953, pages 1300–1313 and 1381–1387. Briefly, an "and" gate is one in which an input must appear simultaneously on each of the input lines in order for an output to be produced. An "inhibited and" gate is one in which an output is produced only in the presence of signals on all input lines except the inhibiting input line. A signal on the inhibiting line prevents an output under any condition.

The internal construction of the gating circuits is immaterial provided the desired function is performed. FIG. 3 illustrates a possible "and" gate gate circuit constructed from diodes and resistors and a possible "inhibitor and" circuit composed of diodes, a triode, and resistors. This circuit will function with either pulsed or continuous input signals. FIG. 3a illustrates another possible "inhibitor and" circuit which uses a transformer rather than triode of FIG. 3 circuit and is suitable for pulsed input signals.

The operation of the amplitude discriminator device can be described with the aid of FIGS. 1–4. For zero reference signal on the first pair of deflection plates 2 and no signal input on the second pair of deflection plates 3, the beam 4 is positioned at the edge of target electrode 7 as in FIG. 1 thereby providing an output across $R_{La}$. The maximum value of reference signal will be dictated by the size of target electrode 7. Increasing the reference voltage deflects the beam 4 downward linearly. When signal input pulses are applied to deflection plates 3, the beam 4 is deflected upward towards target electrode 5. The device will provide output signals when the beam 4 is positioned to illuminate the electrode or electrodes. External circuitry 9, 10, and 11 are provided to perform the following logical functions:

(1) Signals at A and B produce output at D (2) Signals at B and C produce output at E (3) If output at D but not E output obtained at F (4) If output at D and E no output obtained at F.

This is evident from FIG. 2 where pulses of amplitude shown at 12 and 14 produce no output while pulses of amplitude 13 result in output at F. This output then can be used as a gate control signal.

The operation of the gating circuits suggested in FIGS. 3 and 3a can be described with the aid of FIGS. 2 and 4. The zero reference condition in absence of a signal input is an output across $R_{La}$ which results in a low relative potential at A while other points are at high relative potential (see FIG. 4). Deflection of the beam 4 by a signal input on the second pair of deflection plates 3 by pulses of amplitude such as 12 would not be of sufficient magnitude to cause illumination of target electrode 6 and an output across $R_{Lb}$, therefore, the state of the circuit would remain unchanged. Deflection of the beam 4 by pulses of amplitude such as 13 would effect illumination of both electrodes 7 and 6 thereby causing an output across both $R_{La}$ and $R_{Lb}$. This negative pulse output completes the requirement for the diode "and" gating circuit 10 illustrated in FIG. 4 and an output signal appears at point D, thereby producing a low relative potential at D. The inhibiting input E of the "inhibiting and" circuit 11 remains at high relative potential because there is no output across $R_{Lc}$, therefore, a negative gate control signal appears at point F. The third situation, that of pulses of amplitude such as 14 that are above the desired amplitude range, would effect illumination of all three target electrodes 5, 6 and 7 thereby causing outputs across $R_{La}$, $R_{Lb}$ and $R_{Lc}$. The outputs simultaneously across $R_{Lb}$ and $R_{Lc}$ produces a signal on the inhibiting line E thus lowering the relative potential at E which prevents an output at point F under any circumstances.

It will be appreciated that deflection of the beam is accomplished electrostatically and that the degree of deflection in response to signal voltages is proportional to the potential difference between deflection plates 3. It will moreover be understood that the angle of the beam produced by electron gun 1 is determined by the characteristics of the electron gun. The angle of the electron beam therefore does not increase as the amplitude of the input signals increases but remains constant regardless of the number of targets the beam may be striking at any given time.

It is clear that the invention is not limited to examples of embodiments shown and described, but may, on the contrary, be capable of many modifications, in particular, the specific construction of the gating circuitry.

I claim:

1. A signal amplitude discriminator comprising a cathode-ray tube having an electron gun for producing a beam, a first pair of deflection plates, a second pair of deflection plates operating in the same direction as the said first deflection plates, and a plurality of target electrodes situated in the plane of the beam, means for applying an adjustable reference voltage to said first pair of deflection plates, means for applying an input signal to said second pair of deflection plates, an output circuit, means connecting said output circuit to said plurality of target electrodes for producing an output signal when said beam impinges on one group of target electrodes and for preventing the production of an output signal when the beam impinges on another group of electrodes.

2. A signal amplitude discriminator comprising a cathode-ray tube having beam forming means, first beam deflecting means, second beam deflecting means and first, second, and third target electrodes arranged in the line of deflection of said beam; means for applying an adjustable reference voltage to said first deflection means; means for applying an input signal to said second deflection means; a first "and" gate having input circuits connected to said first and second target electrodes; a second "and" gate connected to said second and third target electrodes; an inhibited "and" gate having an output circuit, an input circuit connected to the output of said first "and" gate and an inhibiting, input circuit connected to the output of said second "and" gate.

3. A signal amplitude discriminator comprising: a cathode-ray tube having beam forming means, first beam deflecting means, second beam deflecting means and first, second and third target electrodes arranged in the line of deflection of said beam; means for applying an adjustable reference voltage to said first deflection means; means for applying an input signal to said second deflection means; a first gating means connected to said first and second target electrodes and operative when said beam impinges on said electrodes simultaneously to produce a first signal; a second gating means connected to said second and third target electrodes and operative when said beam impinges on said electrodes simultaneously to produce a second signal; and a third gating means having an output circuit, an input circuit connected to receive said first signal and an inhibiting input circuit connected to receive said second signal for producing an output signal in said output circuit in the presence of said first signal provided said second signal is absent.

4. A signal amplitude discriminator comprising a cathode-ray tube having a beam adapted to be deflected at different deflection angles by application of different voltages to the said tube's deflection electrodes, said tube having signal outputs A, B and C, a pair of like external circuits whose input leads are respectively A, B and B, C, said pair of circuits' output leads are respectively D and E, and a third external circuit whose input leads are D and E and output is F, the said external circuits perform the following logical functions:

(1) Signals at A and B produce output at D (2) Signals at B and C produce output at E (3) If output at D but not E output obtained at F (4) If output at D and E no output obtained at F.

5. A signal amplitude discriminator comprising a cathode-ray tube having beam forming means, first beam deflecting means, second beam deflecting means operating in the same direction as the said first deflecting means and first, second, and third overlapping target electrodes arranged in the line of deflection of said beam; means for applying an adjustable direct reference voltage to said first deflection means of such magnitude as to cause said beam to impinge only upon said first target electrode; means for applying an input signal to said second deflection means; a first "and" gate having input circuits connected to said first and second target electrodes; a second "and" gate connected to said second and third target electrodes; an inhibited "and" gate having an output circuit, an input circuit connected to the output of said first "and" gate and an inhibiting input circuit connected to the output of said second "and" gate.

6. A signal amplitude discriminator comprising: a cathode-ray tube having beam forming means, first beam deflecting means, second beam deflecting means operating in the same direction as the said first deflecting means and first, second and third overlapping target electrodes arranged in the line of deflection of said beam; means for applying an adjustable direct reference voltage to said first deflection means of such magnitude as to cause said beam to impinge only upon said first target electrode; means for applying an input signal to said second deflection means; a first gating means connected to said first and second target electrodes and operative when said beam impinges on said electrodes simultaneously to produce a first signal; a second gating means connected to said second and third target electrodes and operative when said beam impinges on said electrodes simultaneously to produce a second signal; and a third gating means having an output circuit, an input circuit connected to receive said first signal and an inhibiting input circuit connected to receive said second signal for producing an output signal in said output circuit in the presence of said first signal provided said second signal is absent.

References Cited in the file of this patent

UNITED STATES PATENTS

| | | |
|---|---|---|
| 2,560,166 | Glenn | July 10, 1951 |
| 2,670,445 | Felker | Feb. 23, 1954 |
| 2,685,049 | Steinberg | July 27, 1954 |
| 2,736,802 | Cranberg | Feb. 28, 1956 |
| 2,879,411 | Faulkner | Mar. 24, 1959 |